US008824265B2

(12) United States Patent
Maes et al.

(10) Patent No.: US 8,824,265 B2
(45) Date of Patent: Sep. 2, 2014

(54) METHOD AND APPARATUS FOR CONFIGURING A MULTI-CARRIER DATA COMMUNICATION PATH

(75) Inventors: Jochen Maes, Veerle (BE); Mamoun Guenach, Machelen (BE); Michael Peeters, Lint (BE)

(73) Assignee: Alcatel Lucent, Boulogne-Billancourt (FR)

( * ) Notice: Subject to any disclaimer, the term of this patent is extended or adjusted under 35 U.S.C. 154(b) by 193 days.

(21) Appl. No.: 13/130,005

(22) PCT Filed: Dec. 1, 2009

(86) PCT No.: PCT/EP2009/008652
§ 371 (c)(1),
(2), (4) Date: Jul. 5, 2011

(87) PCT Pub. No.: WO2010/069474
PCT Pub. Date: Jun. 24, 2010

(65) Prior Publication Data
US 2011/0261674 A1    Oct. 27, 2011

(30) Foreign Application Priority Data

Dec. 18, 2008   (EP) .................................... 08291206

(51) Int. Cl.
*H04J 3/10*       (2006.01)
*H04B 3/46*       (2006.01)
*H04B 3/32*       (2006.01)

(52) U.S. Cl.
CPC . *H04B 3/32* (2013.01); *H04B 3/464* (2013.01)
USPC .......................................... 370/201; 370/252

(58) Field of Classification Search
None
See application file for complete search history.

(56) References Cited

U.S. PATENT DOCUMENTS

| 6,885,746 | B2 * | 4/2005 | Hausman et al. | 379/417 |
| 8,073,135 | B2 * | 12/2011 | Rhee et al. | 379/417 |
| 2003/0231603 | A1 * | 12/2003 | McClennon et al. | 370/286 |
| 2007/0004286 | A1 * | 1/2007 | Hobbel | 439/676 |
| 2007/0036339 | A1 | 2/2007 | Cioffi et al. | |
| 2007/0286084 | A1 * | 12/2007 | Magnone et al. | 370/241 |
| 2008/0031313 | A1 * | 2/2008 | Oksman | 375/222 |

FOREIGN PATENT DOCUMENTS

EP              1936825 A1     6/2008
WO     WO-2006129145 A2    12/2006

OTHER PUBLICATIONS

International Search Report.

* cited by examiner

*Primary Examiner* — Rhonda Murphy
(74) *Attorney, Agent, or Firm* — Harness, Dickey & Pierce

(57) ABSTRACT

The present invention relates to a method for configuring communication parameters for communication through a first multi-carrier data communication path (DPx) established over a first subscriber line (Lx), and comprising the steps of:
  detecting a request (init_req, join_req(y)) whereby a second multi-carrier data communication path (DPy) is to be initialized over a second subscriber line (Ly),
A method according to the invention further comprises the steps of:
postponing initialization of the second data communication path, acquiring crosstalk characteristics (XT_char_xy(k)) from the second subscriber line towards the first subscriber line,
deriving from the crosstalk characteristics a parameter value (VN_x(k)) characterizing a virtual noise model used for communication over the first data communication path, and applying the parameter value for further communication over the first data communication path, and
resuming initialization of the second data communication path.
The present invention also relates to an access node.

7 Claims, 2 Drawing Sheets

METHOD AND APPARATUS FOR CONFIGURING A MULTI-CARRIER DATA COMMUNICATION PATH

BACKGROUND

The present invention relates to a method for configuring communication parameters for communication through a multi-carrier data communication path established over a subscriber line.

RELATED ART

Digital Subscriber Line (DSL) robustness and stability play a crucial role in the successful delivery of video. Compared to High-Speed Internet Access (HSIA) deployment in the past, DSL in video deployments must operate at much higher speeds, usually close to the performance limits of the subscriber line. This leads to an increased sensitivity to dynamic crosstalk from the on-and-off switching of neighboring lines, occasionally resulting in line retraining and service interruptions. While these retrains could go unnoticed for HSIA services, the loss of video service for tens of seconds is clearly annoying and undesired. As a rule of thumb, operators often target a maximum of one retrain per week, with more than one retrain every two days considered as unacceptable. To achieve this goal, special precautions can be taken on the DSL PHY layer. Some of these are as follows:

- The DSL transmit spectrum can be optimized to minimize crosstalk between neighboring lines. However, this can make the line more sensitive to noise variation, resulting in visual distortion on the screen. For this reason, there should be an appropriate trade-off between maximization of stability and crosstalk reduction, which is not straightforward.
- A good network design balances bit rate and noise margin. An increased noise margin at the receiver can cope with more noise variation. As such, it increases the robustness of the DSL transmission at the expense of a reduced bit rate.
- A technique called virtual noise enables the limitation of the crosstalk impact on the victim line, by protecting the line at start-up against future noise increases. Compared to the 'noise margin' approach, virtual noise will not overprotect the line.

Figure 1:
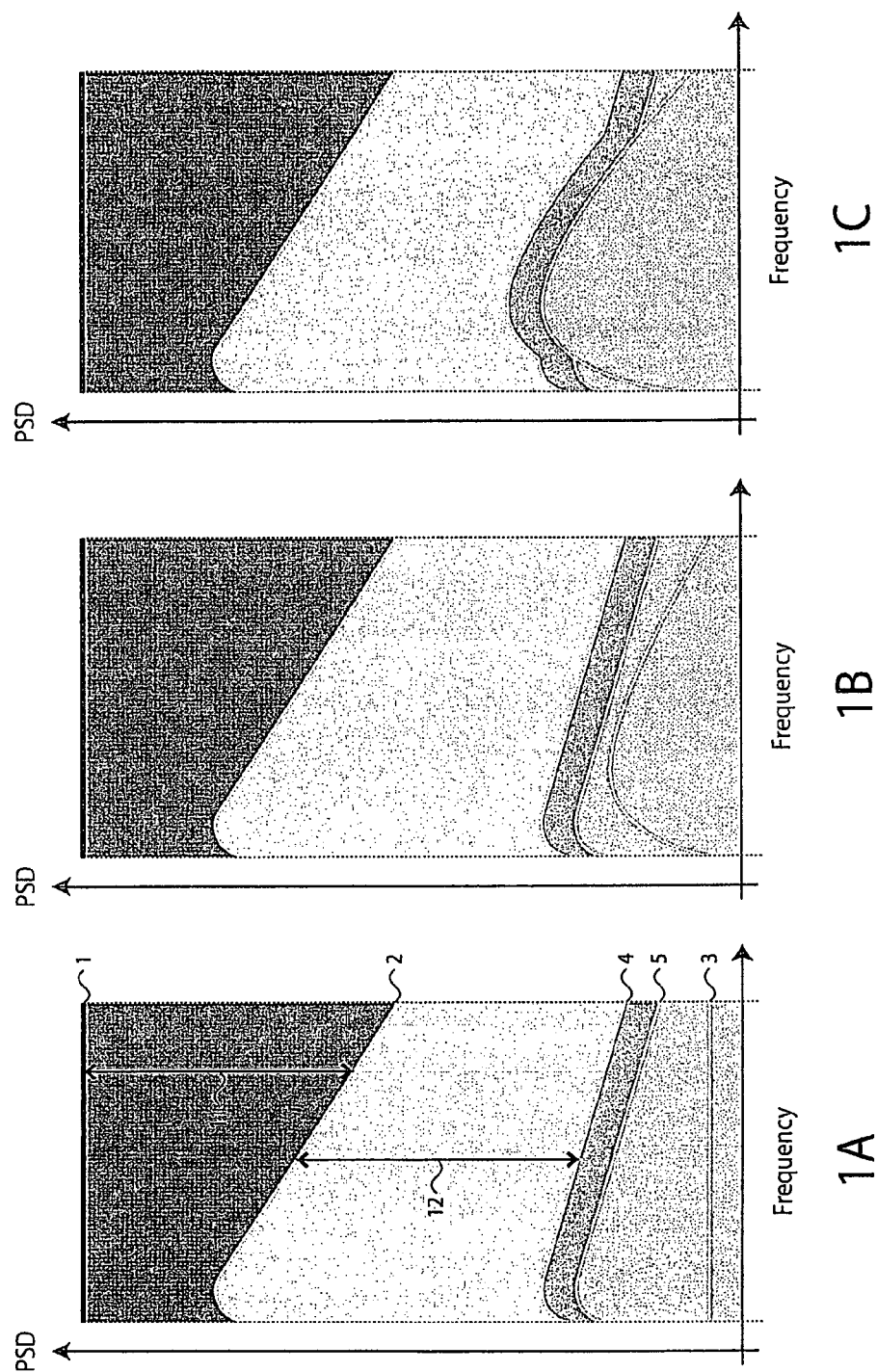

There is seen in FIG. 1 an illustrative example of what the virtual noise is meant to be.

The Power Spectral Density (PSD, unit dBm/Hz) of the transmit signal 1 and receive signal 2 are plotted versus the frequency, and so is a measured noise PSD 3.

The difference 11 between 1 and 2 is indicative of the insertion loss (or loop attenuation) introduced by the subscriber line. A noise margin 4 is configured on top of the actual measured noise PSD 3, and the difference 12 between 2 and 4 is indicative of the achievable bit loading for the corresponding carrier, and further of the total data rate.

A virtual noise 5 is configured and, wherever the actual noise is lower than the configured virtual noise, substitutes for the actual measured noise 4 for determining the applicable bit loading. By so doing, the system can absorb crosstalk from neighboring lines that are not active yet. The use of an additional noise margin would have reduced the data rate even further.

FIG. 1A represents a first crosstalk environment and related carrier bit loadings, wherein there are no disturbers active, and wherein the measured noise PSD corresponds to a flat noise floor. FIG. 1B represents a second crosstalk environment and related carrier bit loadings, wherein the crosstalk from the neighboring lines still confines within the boundaries of the configured virtual noise. FIG. 1C represents a third crosstalk environment and related carrier bit loadings, wherein crosstalk from the neighboring lines exceeds the configured virtual noise.

If a line is initialized with no disturbers active, such as depicted in FIG. 1A, then the line will be able to cope with a further increase of crosstalk, such as depicted in FIG. 1B. Yet, the very same line will starts experiencing bit errors and will probably need to be retrained if some crosstalk emerges that exceeds the configured virtual noise plus the noise margin: a new ad-hoc bit loading, such as depicted in FIG. 1C, will then be determined, and the line will be brought back into service, yet with a lowered data rate.

Consequently, virtual noise is typically configured according to the worst case disturbers that can potentially be present.

The virtual noise has been recently adopted as part of Very high speed Digital Subscriber Line 2 (VDSL2) G.993.2 Standard, published by the International Telecommunication union (ITU) in February, 2006, and is explicited in §11.4.1.1.6.1.2, p. 115 (SNRM_MODE=2).

As is clear from the previous discussion, the optimal configuration of a DSL line—defined as maximum bit rate at a minimum transmit power and under stable operating conditions—is far from trivial.

SUMMARY

It is an object of the present invention to improve the resilience of a DSL-based, and more generally of a multi-carrier based, communication system.

The objectives of the present invention are achieved and the aforementioned shortcomings of the prior art are overcome by a method for configuring communication parameters for communication through a first multi-carrier data communication path established over a first subscriber line, and comprising the steps of:

- detecting a request whereby a second multi-carrier data communication path is to be initialized over a second subscriber line, characterized in that said method, thereupon, further comprises the steps of:

- postponing initialization of said second data communication path,
- acquiring crosstalk characteristics from said second subscriber line towards said first subscriber line,
- deriving from said crosstalk characteristics a parameter value characterizing a virtual noise model used for communication over said first data communication path, and applying said parameter value for further communication over said first data communication path, and
- resuming initialization of said second data communication path.

The initialization of a data communication path over a new joining line is postponed, e.g. by not replying the DSL handshake message from Customer Premises Equipment (CPE). Meanwhile, the crosstalk characteristics from that new joining line towards a potential victim line are acquired, and a new virtual noise value is determined that should apply over the victim line. This new virtual noise value integrates the coming crosstalk from the joining line (although this line did not start up yet), and is applied over the victim line so as to pro-actively protect the victim line against the joining event.

The new virtual noise value is preferably applied on-line, although such a provision has not been standardized yet (no standardization is required for upstream communication).

New bit loading values are then computed according to the new virtual noise value, and applied by means of seamless Rate Adaptation (SRA). Once the new bit loading values are in force, the initialization procedure over the joining line resumes.

A method according to the invention allows the joining of a subscriber line without interrupting the service over the neighboring lines by pro-actively preparing the neighboring lines against the coming interferences from the joining line. Because the mechanism dynamically adapts to current conditions, it achieves higher data rates than a statically-configured virtual noise (when the actual number of active lines is lower than the assumed worst-case number of crosstalkers that is typically used for hard-configuring the virtual noise). The present invention is really seamless, and avoids loosing data or interrupting the flow of data during a joining event.

The present invention can indifferently be applied to downstream (from the central office towards the customer premises) and/or upstream (from the customer premises towards the central office) communication.

A further embodiment of a method according to the invention is characterized in that said crosstalk characteristics includes a transmit signal Power Spectral Density PSD and a crosstalk coupling transfer function.

Typically, the transmit signal PSD conforms to a pre-determined power spectral mask, while the crosstalk coupling transfer function is determined by means of noise measurements reported by the CPE (e.g., by means of the measured slicer error, or by means of signal-to-Noise Ratio (SNR) measurements, or by means of Quiet Line Noise (QLN) measurements).

Alternatively, said crosstalk characteristics includes a receive crosstalk Power Spectral Density PSD.

The receive crosstalk PSD can be computed from the transmit signal PSD and the crosstalk coupling transfer function, or can be measured by the CPE or by a test equipment with specific test signals, or can be a modelled crosstalk PSD.

Said crosstalk characteristics may either be read from a local data repository, or acquired through e.g. a packet-switched network from a remote central data repository.

A further embodiment of a method according to the invention is characterized in that said parameter value is further derived from further crosstalk characteristics from further subscriber lines towards said first subscriber line.

For instance, one may compute the power sum of the crosstalk from the already active neighboring lines and from the new joining line towards the victim line, and use that power sum for determining the new virtual noise value.

By considering not only the new joining line but also the already present crosstalkers, the virtual noise value fits the crosstalk that is expected to be present when the joining line will enter in showtime mode.

This embodiment does not apply when the crosstalk from the already active neighboring lines towards the victim line is pre-compensated at the transmit side, or post-compensated at the receive side, and virtually eliminated, in which case it is sufficient to configure the virtual noise according to the expected crosstalk from the new joining line only.

It is to be further noticed that, in the absence of crosstalk pre/post-compensation, ignoring the already active crosstalkers and considering the joining line only would result in a 3 dB error at most, which value being typically absorbed by the configured noise margin. Indeed, and assuming that SRA continuously applies to fit changing noise conditions, the noise reference value for computing the respective bit loading values is defined as the maximum between the configured virtual noise value (presently, crosstalk from the new joining line) and the actual measured noise value (presently, crosstalk from the other disturber lines, if any), and the highest error occurs when both are equal, that is to say a 3 dB difference between the actual and reference noise values.

The present invention also relates to an access node for terminating a first multi-carrier data communication path established over a first subscriber line, and a second multi-carrier data communication path to be established over a second subscriber line, and comprising:
  a line initialization control agent adapted to detect a request whereby said second data communication path is to be initialized over said second subscriber line,
characterized in that said line initialization control agent is further adapted, thereupon, to postpone initialization of said second data communication path,
in that said access node further comprises:
  a virtual noise configuration agent coupled to said line initialization means, and adapted, while initialization of said second data communication path is postponed, to acquire crosstalk characteristics from said second subscriber line towards said first subscriber line, to derive from said crosstalk characteristics a parameter value characterizing a virtual noise model used for communication over said first data communication path, and to apply said parameter value for further communication over said first data communication path,
and in that said line initialization control agent if further adapted, thereupon, to resume initialization of said second data communication path.

Embodiments of an access node according to the invention correspond with the embodiments of a method according to the invention.

DRAWINGS

The above and other objects and features of the invention will become more apparent and the invention itself will be best understood by referring to the following description of an embodiment taken in conjunction with the accompanying drawings wherein:
  FIG. 1 represents the virtual noise paradigm (prior art),
  FIG. 2 represents an access node according to the invention.

DETAILED DESCRIPTION

Figure 2:
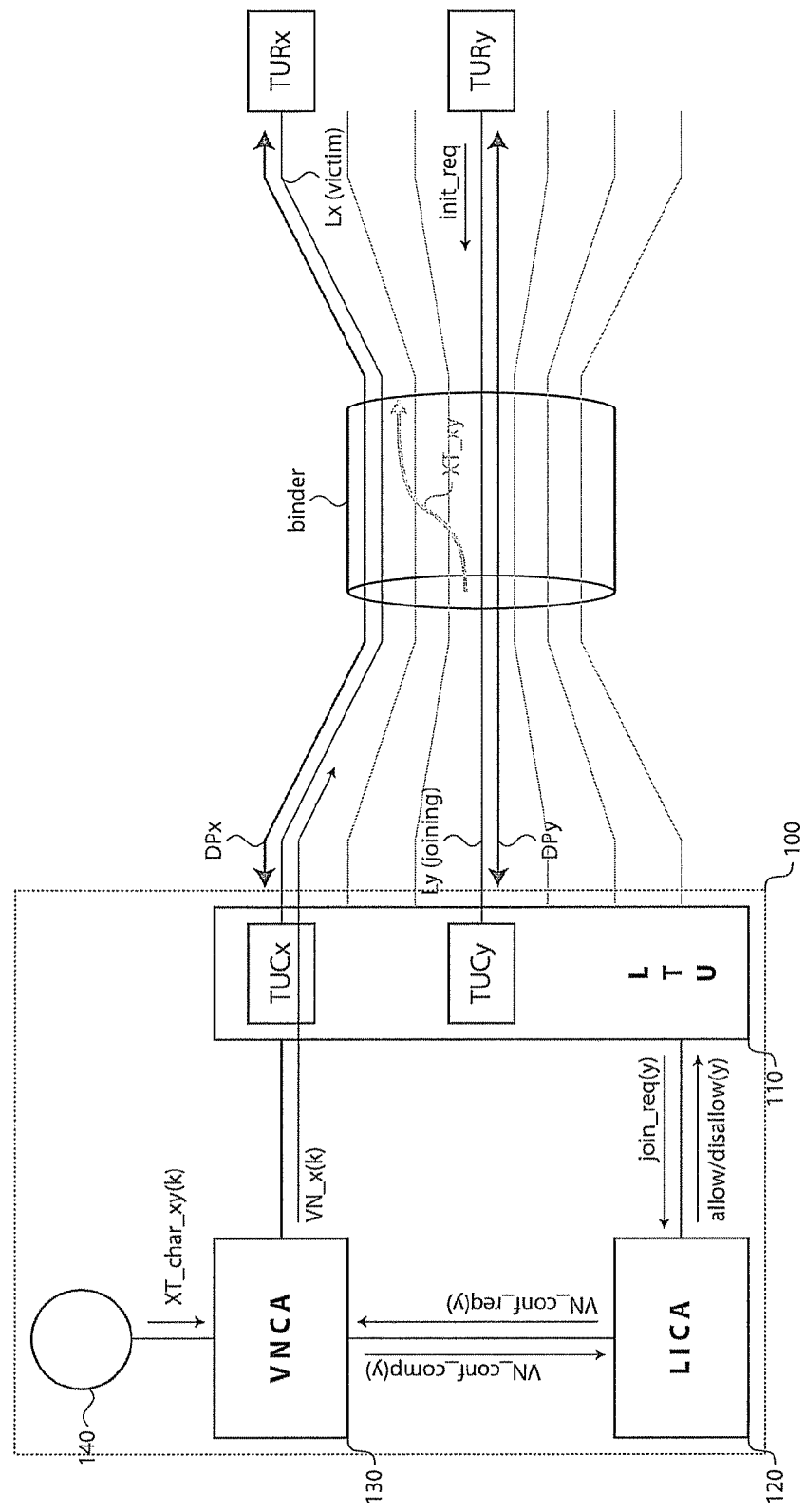

There is seen in FIG. 2 an access node 100, such as a Digital subscriber Line Access Multiplexer (DSLAM) located at a central office or at a remote cabinet, and comprising the following noticeable functional blocks:
  Line Termination Units (LTU) 110, for connecting to CPE,
  a Line Initialization Control Agent (LICA) 120,
  a Virtual Noise Configuration Agent (VNCA) 130.
  a local data repository 140.

The line termination units 110 are coupled to the line initialization control agent 120 and to the virtual noise configuration agent 130. The line initialization control agent 120 is further coupled to the virtual noise configuration agent 130. The virtual noise configuration agent 130 is further coupled to the local data repository 140.

The line termination units 110 comprise transceiver units, inc. TUCx and TUCy, for terminating and operating DSL subscriber lines, and for interalia initializing a DSL data communication path over a subscriber line.

The DSL initialization procedure is described in G.994.1 ITU specification, and comprises an handshake phase, a channel discovery phase, a channel training phase, and a channel analysis & exchange phase.

During the handshake phase of the initialization procedure, the transceiver units exchange capability lists and agree on a common mode for training and operation. A successful completion of the handshake phase will lead to either the channel discovery phase or to the loop diagnostic mode (depending on which one is selected). Failure of the handshake phase leads back to the L3 state (off-line state).

During the channel discovery, training, and channel analysis & exchange phases of the initialization procedure, the transceiver units train their respective transceivers. During these phases, the transceivers identify channel conditions, exchange parameters for showtime operation, etc. upon successful completion of the initialization procedure, the transceivers transition to the L0 state (on-line state or showtime). Upon unsuccessful completion of the initialization procedure, or upon persistent link failure, or upon power loss, the transceiver units return to the L3 state (retrain).

The line termination units 110 are further adapted to notify the initialization control agent 120 about a new line starting up, being on behalf of the transceiver unit at the central office or the transceiver unit at the customer premises, and further to carry out the DSL initialization and training procedure after approval from the line initialization control agent 120.

The line initialization control agent 120 is adapted to request the virtual noise configuration agent 130 to reconfigure the virtual noise for whatever line(s) that might be potentially impacted by the new joining line.

The line initialization control agent 120 is further adapted to allow or disallow the initialization of a DSL data communication path over a subscriber line based on the virtual noise configuration outcome from the virtual noise configuration agent 130.

The local data repository 140 holds crosstalk characteristics on a per victim/disturber pair basis.

The virtual noise configuration agent 130 is adapted to identify the candidate victim lines that can potentially be impacted by the interferences from the new joining line, e.g. by scanning the crosstalk database and by looking for the highest crosstalk coupling from that joining line.

The virtual noise configuration agent 130 is further adapted to determine PSD values representative, at the so-identified candidate victim receiver(s), of the received crosstalk from the new joining line. Preferably, the PSD values are relative to the direct transfer function PSD of the victim line so as they translate directly into virtual noise value as specified in G.993.2. The received crosstalk PSD values are either acquired directly from the local data repository 140, or computed from the transmit signal PSD and from the relative crosstalk coupling functions. For instance, the relative crosstalk coupling functions may be derived from the precoding coefficients of a precoding matrix used for signal precoding.

The virtual noise configuration agent 130 is further adapted to determine virtual noise values to be applied over a victim line based on the so-determined received crosstalk PSD values from the joining line. The virtual noise configuration agent 130 may further include the contribution from further active crosstalkers, provided the virtual noise configuration agent 130 keeps track of which line is active or not.

The virtual noise configuration agent 130 is further adapted to on-line reconfigure virtual noise values to be used at victim receivers by interacting with the line termination units 110. The on-line reconfiguration of the virtual noise is carried out by means of OLR commands.

The virtual noise configuration agent 130 is further adapted to notify the line initialization control agent 120 about the outcome of the virtual noise reconfiguration process.

An operation of the access node 100 follows.

The access node 100 is coupled to CPE via unshielded Twisted Pairs (UTP), such as CAT3 cables. Presently, the transceiver unit TUCx is coupled to a first remote transceiver unit TURx via a first subscriber line Lx, and the transceiver unit TUCy is coupled to a second remote transceiver unit TURy via a second subscriber line Ly. TURx and TURy form part of e.g. a modem, a gateway, a router, a set top box, a subscriber terminal, etc.

It is further assumed that a first DSL data communication path DPx is established over the subscriber line Lx, and that both TUCx and TURx are in showtime mode. The data path DPX comprises an upstream data communication path and a downstream data communication path using distinct upstream and downstream frequency bands (frequency division multiplexing). Respective bit loadings for upstream and downstream communication, and ultimately a total upstream data rate and a total downstream data rate, have been determined and agreed upon during the initialization of the data path DPx.

The joining line is denoted as Ly, and forms part of the same binder as the line Lx (see binder in FIG. 2), thereby causing some significant amount of the signal transmitted by TUCy to leak from line Ly to line Lx and to be detected by TURx (see XT_xy in FIG. 2). This phenomena is referred to as Far-End crossTalk (FEXT), and is the major cause of channel impairment for DSL communication (together with impulse noise at customer premises).

TURy issues a request whereby a second DSL data communication path Dy is to be initialized over the subscriber line Ly (see init_req in FIG. 2). This request is for instance a R_TONES_REQ signal as defined in G.994.1. Alternatively, the initialization of the data communication path DPy can be triggered by the access node 100 (e.g., in case of reboot or power failure or line card failure).

TUCy notifies the line initialization control agent 120 about the joining event on line Ly, and requests the line initialization control agent 120 whether the data path DPy can be initialized or not (see join_req(y) in FIG. 2). Presently, the line initialization control agent 120 postpones the initialization of the data path DPy (see disallow(y) in FIG. 2). Consequently, TUCy does not answer the R-TONES-REQ signal, and TURy keeps on repeating the R-TONES_REQ signal until further acknowledgment.

The line initialization control agent 120 requests the virtual noise configuration agent 130 to configure the virtual noise for all potentially impacted victim lines (see VN_conf_req(y) in FIG. 2).

First, the virtual noise configuration agent 130 identifies the potential victim lines that might be impacted by the interferences from the new joining line Ly, presently Lx. Next, the virtual noise configuration agent 130 retrieves or computes the received noise PSD values representative of the crosstalk that TURx is expected to experience from the joining line Ly (see XT_char_xy(k) in FIG. 2, wherein k denotes a carrier or tone index). The virtual noise configuration agent 130 may also look for the already active disturbers for line Lx, and may compute the power sum of all received noise PSD values representative of the respective crosstalk that TURx is expected to experience from the already active disturbers and from the new joining line Ly. Finally, the virtual noise configuration agent 130 derives a virtual noise value VN_x(k) to be applied over the victim line Lx. As all the crosstalk PSD values are relative PSD values, they translate directly into virtual noise values. Note that in VDSL2, the virtual noise is not defined on a per tone basis, but with a limited set of breakpoints.

The new virtual noise value VN_x(k) is sent on-line to TURx by means of OLR commands. TURx applies the new virtual noise value and starts seamlessly adapting the downstream bit rate by sending back new bit loading and gain values {bk,gk} to TUCx. TUCx notifies the virtual noise configuration agent 130 about this SRA event over the victim line Lx.

The process re-iterates for further victim lines, if any. Thereupon, the virtual noise configuration agent 130 notifies the line initialization control agent 120 about the completion of the virtual noise reconfiguration process (see VN_conf_comp(y) in FIG. 2).

The line initialization control agent 120 then allows the joining line Ly to come on line (see allow(y) in FIG. 2), and the initialization procedure resumes for the data path Dy.

At this stage, line Lx is fully protected against the coming interferences from line Ly.

Once line Ly is active, the so-configured virtual noise value can be left as such or can be cleared. Leaving the virtual noise as such would prevent any throughput gain from crosstalk pre/post-compensation.

Although the present invention has been described with reference to downstream communication, it may similarly apply to upstream communication, in which case TUCx is configured with a new virtual noise value at once.

In an alternative embodiment of the present invention, the virtual noise configuration agent 130 does not wait for new bit loading values to be applied before notifying the line initialization control agent 120 about the outcome of the virtual noise configuration process.

In an alternative embodiment of the present invention, the virtual noise configuration agent 120 queries a remote central data repository, wherein the crosstalk characteristics between subscriber lines are stored. The subscriber lines are unambiguously identified by means of some public identifier. This embodiment is rather advantageous in case of local loop unbundling deployment.

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method for configuring communication parameters for communication through a first multi-carrier data communication path established over a first subscriber line, the method comprising:
    detecting a request whereby a second multi-carrier data communication path is to be initialized over a second subscriber line,
    postponing initialization of said second data communication path in response to the detected request,
    acquiring, while the initialization of said second data communication path is postponed, crosstalk characteristics from said second subscriber line towards said first subscriber line and from at least one further subscriber line towards said first subscriber line, the at least one further subscriber line including at least one already active subscriber line,
    deriving, while the initialization of said second data communication path is postponed, from said crosstalk characteristics a parameter value characterizing a virtual noise model used for communication over said first data communication path,
    applying, while the initialization of said second data communication path is postponed, said parameter value for further communication over said first data communication path, and
    resuming initialization of said second data communication path.

2. A method according to claim 1, wherein said crosstalk characteristics include a transmit signal Power Spectral Density PSD and a crosstalk coupling transfer function.

3. A method according to claim 1, wherein said crosstalk characteristics are acquired from a local data repository.

4. A method according to claim 1, wherein said crosstalk characteristics are remotely acquired from a central data repository.

5. A method according to claim 1, wherein said parameter value is applied on-line.

6. A method according to claim 1, wherein said crosstalk characteristics include a received crosstalk Power Spectral Density PSD.

7. An access node for terminating a first multi-carrier data communication path established over a first subscriber line, and a second multi-carrier data communication path to be established over a second subscriber line, the access node comprising:
    a line initialization control agent configured to detect a request whereby said second data communication path is to be initialized over said second subscriber line, said line initialization control agent being configured to postpone initialization of said second data communication path,
    a virtual noise configuration agent coupled to said line initialization control agent, and configured to, while initialization of said second data communication path is postponed,
    acquire crosstalk characteristics from said second subscriber line towards said first subscriber line and from at least one further subscriber line towards said first subscriber line, the at least one further subscriber line including at least one already active subscriber line,
    derive from said crosstalk characteristics a parameter value characterizing a virtual noise model used for communication over said first data communication path, and apply said parameter value for further communication over said first data communication path, wherein said line initialization control agent is configured to resume initialization of said second data communication path after application of said parameter value.

* * * * *